United States Patent
Echlin et al.

(10) Patent No.: US 11,414,082 B2
(45) Date of Patent: Aug. 16, 2022

(54) ESTIMATING AMBIENT AIR TEMPERATURE AND DIAGNOSING SENSOR FAILURE USING INTERCOOLER EFFICIENCY

(71) Applicant: PACCAR Inc, Bellevue, WA (US)

(72) Inventors: John Echlin, Mount Vernon, WA (US); Mark Lamont Lott, Oak Harbor, WA (US); Christopher William John Mabson, Bellevue, WA (US)

(73) Assignee: PACCAR Inc, Bellevue, WA (US)

( * ) Notice: Subject to any disclaimer, the term of this patent is extended or adjusted under 35 U.S.C. 154(b) by 59 days.

(21) Appl. No.: 16/996,439

(22) Filed: Aug. 18, 2020

(65) Prior Publication Data
US 2022/0055628 A1 Feb. 24, 2022

(51) Int. Cl.
*B60W 40/02* (2006.01)
*B60W 40/105* (2012.01)
*B60W 50/02* (2012.01)
*B60W 50/14* (2020.01)

(52) U.S. Cl.
CPC .......... *B60W 40/02* (2013.01); *B60W 40/105* (2013.01); *B60W 50/0205* (2013.01); *B60W 50/14* (2013.01); *B60W 2510/0676* (2013.01); *B60W 2555/20* (2020.02)

(58) Field of Classification Search
CPC combination set(s) only.
See application file for complete search history.

(56) References Cited

U.S. PATENT DOCUMENTS

| | | | |
|---|---|---|---|
| 9,261,012 B2* | 2/2016 | Saitoh | ...... F01P 7/16 |
| 2009/0078033 A1 | 3/2009 | Iwai | |
| 2009/0139317 A1 | 6/2009 | Deivasigamani | |
| 2014/0026831 A1 | 1/2014 | Mahrs | |

FOREIGN PATENT DOCUMENTS

| | | | |
|---|---|---|---|
| DE | 10 2005 042651 A1 | 3/2007 | |
| EP | 1548260 A2 * | 6/2005 | ......... F02D 41/0007 |
| EP | 3290675 A1 | 3/2018 | |

OTHER PUBLICATIONS

JP 2008267390 A. "Air Quantity Estimation Device for Internal Combustion Engine". English translation. 2008. (Year: 2008).*
JP 2007146712 A. "Device for Judging Abnormality of Intercooler". English translation. 2007. (Year: 2007).*
European Extended Search Report in Application 21191984.0, dated Feb. 11, 2022, 9 pages.

* cited by examiner

*Primary Examiner* — Jeff A Burke
*Assistant Examiner* — Madison B Emmett
(74) *Attorney, Agent, or Firm* — Merchant & Gould P.C.

(57) ABSTRACT

Examples of the present disclosure describe systems and methods for determining an estimated ambient air temperature in an environment in which a vehicle is operating. The estimated ambient air temperature may be compared to an ambient temperature sensor value. The comparison may be used to determine whether an ambient air temperature sensor of the vehicle is functioning properly or if an error notification or fault code should be triggered.

20 Claims, 9 Drawing Sheets

400

VEHICLE OPERATING CONDITIONS

- ENGINE SPEED IS IN STEADY STATE
- VEHICLE SPEED IS IN STEADY STATE
- FAN SPEED IS IN STEADY STATE
- CRANK POWER IS IN STEADY STATE
- CRANK POWER IS >= A LOWER LIMIT
- AMBIENT FLOW IS >= A LOWER LIMIT
- COOLANT TEMPERATURE >= A LOWER LIMIT
- ENGINE RUN TIME >= A LOWER LIMIT
- ESTIMATOR RUN TIME >= A LOWER LIMIT
- AMBIENT PRESSURE >= A LOWER LIMIT
- ENGINE NOT AT IDLE >= A LOWER LIMIT

FIG. 4

| OUTPUT STATES | | |
|---|---|---|
| | INTERCOOLER EXCEED = 0 | INTERCOOLER EXCEED = 1 |
| PRE-COMP COLD EXCEED = 0<br>PRE-COMP HOT EXCEED = 0 | FAULT INACTIVE<br>AIR DIVERTER VALVE INACTIVE | FAULT INDETERMINATE<br>AIR DIVERTER VALVE INDETERMINATE |
| PRE-COMP COLD EXCEED = 1<br>PRE-COMP HOT EXCEED = 0 | FAULT INACTIVE<br>AIR DIVERTER VALVE ACTIVE | FAULT ACTIVE<br>AIR DIVERTER VALVE INDETERMINATE |
| PRE-COMP COLD EXCEED = 0<br>PRE-COMP HOT EXCEED = 1 | FAULT ACTIVE<br>AIR DIVERTER VALVE INDETERMINATE | FAULT ACTIVE<br>AIR DIVERTER VALVE INDETERMINATE |
| PRE-COMP COLD EXCEED = 1<br>PRE-COMP HOT EXCEED = 1 | FAULT ACTIVE<br>AIR DIVERTER VALVE INDETERMINATE | FAULT ACTIVE<br>AIR DIVERTER VALVE INDETERMINATE |

FIG. 7

ESTIMATING AMBIENT AIR TEMPERATURE AND DIAGNOSING SENSOR FAILURE USING INTERCOOLER EFFICIENCY

BACKGROUND

An engine control system of a vehicle typically controls various diagnostics for the vehicle. In some examples, these diagnostics are sensitive to fluctuations in air temperature. Thus, it is necessary for the engine control system to be able to accurately determine the temperature of air and a source of the air that is being pulled into its air induction system.

SUMMARY

Examples of the present disclosure describe systems and methods for determining an estimated ambient air temperature for an environment in which a vehicle is operating. The estimated ambient air temperature may be compared to an ambient temperature sensor value. The comparison may be used to determine whether an ambient air temperature sensor of the vehicle is functioning properly or if an error notification or fault code should be triggered. Determining the estimated ambient air temperature and comparing it with the ambient temperature sensor value reduces false fails when an air diverter valve associated with a vehicle changes state due to blockage or potential blockage of an air intake mechanism of an air induction system of a vehicle.

Accordingly, the present application describes a system including a processor and a memory communicatively coupled to the processor. The memory stores instructions that, when executed by the processor, perform operations. These operations include receiving an ambient air temperature reading from an ambient air temperature sensor associated with a vehicle. A cooling capacity of an intercooler associated with the vehicle is determined. An ambient air flow rate of the intercooler associated with the vehicle is also determined. Additionally, a cooling flow rate of the intercooler associated with the vehicle is determined. An estimated ambient air temperature is then determined based, at least in part, on the cooling capacity of the intercooler, the ambient air flow rate of the intercooler and the cooling flow rate of the intercooler. The system may then determine a difference between the ambient air temperature reading and the estimated ambient air temperature. The system triggers an error notification for the vehicle when the determined difference between the ambient air temperature reading and the estimated ambient air temperature is above a threshold.

The present application also describes a method comprising receiving an ambient air temperature reading from an ambient air temperature sensor associated with a vehicle. An estimated ambient air temperature is determined. The estimated ambient air temperature is based, at least in part, on a determined cooling capacity of an intercooler associated with the vehicle, a determined ambient air flow rate of the intercooler, and a determined cooling flow rate of the intercooler. A difference between the ambient air temperature reading and the estimated ambient air temperature is determined. An error notification for the vehicle is triggered when the determined difference between the ambient air temperature reading and the estimated ambient air temperature is above a threshold.

Also described is a method that includes determining whether a set of vehicle operating conditions are satisfied. When the set of vehicle operating conditions are satisfied, an ambient air temperature reading is received from an ambient air temperature sensor associated with a vehicle. An estimated ambient air temperature is determined based, at least in part, on a determined cooling capacity of an intercooler associated with the vehicle, a determined ambient air flow rate of the intercooler, and a determined cooling flow rate of the intercooler. A difference between the ambient air temperature reading and the estimated ambient air temperature is determined. An error notification for the vehicle is triggered when the determined difference between the ambient air temperature reading and the estimated ambient air temperature is above a threshold.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 4 illustrates a set of vehicle operating conditions that may be considered prior to determining an estimated ambient air temperature according to an example.

FIG. 7 illustrates an example truth table that may be used to determine a state of an air diverter valve of a vehicle according to an example.

DETAILED DESCRIPTION

Figure 1:
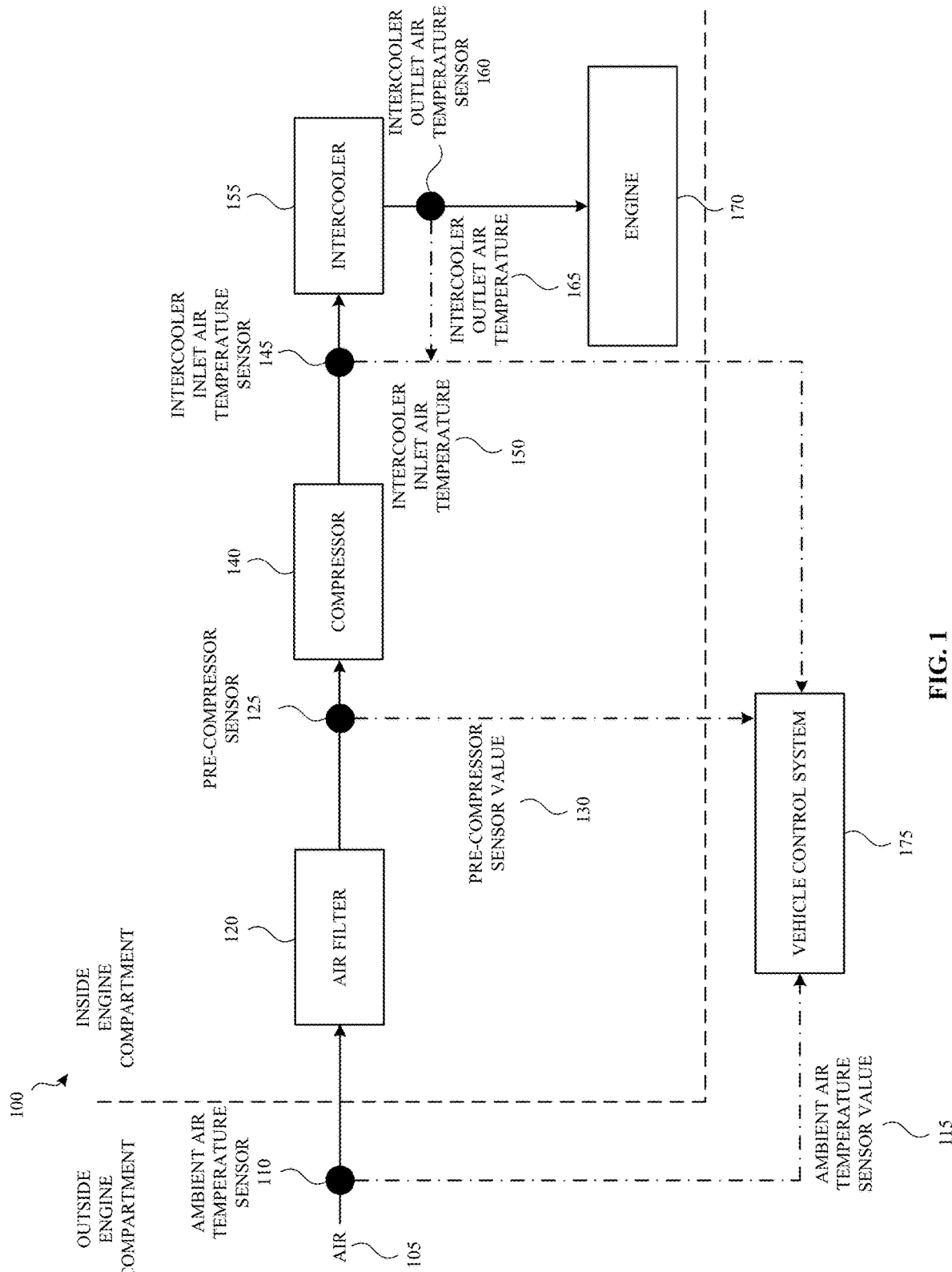
FIG. 1 illustrates an air induction system for a vehicle according to an example.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

An air induction system of a vehicle supplies air to an engine of the vehicle. In some applications, the air induction system includes an air diverter valve that enables the air induction system to intake air from outside of an engine compartment of the vehicle or to intake air from within the engine compartment of the vehicle. Causing the air induction system to intake air from within the engine compartment typically occurs when an air intake mechanism (e.g., a mechanism that pulls in outside air) of the air induction system becomes blocked. For example, in snow plow, oilfield, or firefighting applications, the air intake mechanism may become blocked by snow, dirt, embers or other particles. As such, an air diverter valve may be used to cause the air induction system to pull in air from within the engine compartment rather than from outside the vehicle.

However, a temperature of the air taken from outside of the engine compartment is typically cooler when compared with the temperature of the air taken from within the engine compartment. Warmer intake air from within the engine compartment of the vehicle can disrupt air temperature models of the vehicle and cause false on-board diagnostic failures—especially when a control system of the vehicle cannot determine a state of the air diverter valve.

For example, a vehicle may have an ambient air temperature sensor mounted or otherwise positioned outside of the engine compartment (e.g., on a side mirror). The ambient air temperature value may be compared with a second air temperature value estimated from readings by a second air temperature sensor within the engine compartment to ensure the ambient air temperature sensor is working correctly. If the ambient air temperature value is the same (or within a threshold difference from) the second air temperature value taken by the second air temperature sensor within the engine compartment, then the vehicle control system determines that the ambient air temperature sensor is working correctly (under normal conditions).

However, if the air diverter valve causes the air induction system to pull in warmer air from within the engine compartment, the second air temperature value taken from within the engine compartment may be much higher than the reading taken by the ambient air temperature sensor. If the control system of the vehicle does not know or cannot determine a state of the air diverter valve, the control system may not know whether the air induction system is pulling in cooler outside air or warmer air from within the engine compartment. Thus, as the ambient air temperature value is compared with second air temperature value, the control system of the vehicle may erroneously trigger a failure notification based on the difference between the two air temperature values. In some examples, the failure notification may be associated with the ambient air temperature sensor.

Although a specific example is given, the present application is not limited to this particular application. The determination of a state of the air diverter valve can be used to reduce or eliminate a variety of false failure notifications. For example, various temperature models of the vehicle may be sensitive to changes in air temperature. Thus, if a state of the air diverter valve is known, thresholds associated with those temperature models may be adjusted accordingly. In other aspects, one or more of the temperature models may be deactivated/activated based on a determined state of the air diverter valve.

Accordingly, the present application describes systems and methods for reducing or eliminating false failure notifications caused by use of a diverter valve of the air induction system of a vehicle. In some examples, this is accomplished by determining an estimated ambient air temperature using a determined efficiency of an intercooler associated with the vehicle. Once the estimated ambient air temperature is determined, the estimated ambient air temperature is compared with the ambient air temperature sensor value provided by the ambient air temperature sensor. If the difference between the estimated ambient air temperature and the ambient air temperature sensor value exceeds a threshold for a determined amount of time or for a specified time period (e.g., a certain number of engine cycles), a fault code or other such error notification can be triggered.

The present application also describes a process for determining a state or position of an air diverter valve of the air induction system of the vehicle. The position of the air diverter valve may be determined based, at least in part, on comparisons of the intercooler-based estimate of ambient air temperature, the ambient air temperature sensor value, and the second air temperature value provided by the second sensor. Determining the position or state of the air diverter valve may also be used to better determine whether certain diagnostics of the vehicle are accurate, whether certain diagnostics of the vehicle should be active, and/or whether thresholds associated with the certain diagnostics should be adjusted.

For example, if the air diverter valve is in an active state in which relatively warmer air is being pulled from an engine compartment of the vehicle into the air induction system of the vehicle, certain diagnostic capabilities of the vehicle may be deactivated (or thresholds changed). Likewise, if the air diverter valve is in an inactive state in which cooler (when compared to the temperature of the air within an engine compartment of the vehicle) outside air is pulled into the air induction system, certain diagnostic capabilities of the vehicle may be active.

Accordingly, the present application provides a number of technical benefits including but not limited to: reducing air intake temperature sensitivity for various temperature models of a vehicle engine system, thereby reducing false fails; reducing false fails by using complementary fault detection techniques in parallel (or substantially in parallel); and enabling more robust detection of an air diverter valve by using two different air temperature models having different air temperature sensitivities. In addition to the above, the techniques provided herein do not require any additional hardware, sensors, or wiring. Thus, current vehicles may be effectively retrofit with the solutions described herein.

FIG. 1 illustrates an air induction system 100 for a vehicle according to an example. The air induction system shown in FIG. 1 may be used to estimate an ambient air temperature of ambient air surrounding the vehicle rather than relying solely on an ambient air temperature sensor value 115 provided by an ambient air temperature sensor 110 of the vehicle or a pre-compressor sensor 125 providing a pre-compressor sensor value. The estimated ambient air temperature may be determined based, at least in part, on a determined efficiency or heat rejection capability of an intercooler 155 of the air induction system 100.

As briefly discussed above, dust, snow, embers or other particles may block or otherwise inhibit an air intake mechanism of the air induction system 100 from pulling air from outside of an engine compartment (represented in FIG. 1 as the vertical dashed line) of the vehicle. When the air intake mechanism is blocked (or may likely become blocked), an air diverter valve may switch (or be caused by an operator to switch) states and cause the air induction system 100 to pull warmer air from inside the engine compartment. However, as comparisons are made between air temperature readings taken from the ambient air temperature sensor 110 and a pre-compressor sensor 125, the difference in temperature may cause the control system 175 of the vehicle to trigger a fault notification. The fault notification may be in the form of illumination of a check engine light or other such malfunction indicator lamp. Alternatively, a specific message regarding a fault related to the ambient air temperature sensor 110 may be displayed to a vehicle operator. In this example, the notification may actually be a false fail because the ambient air temperature sensor 110 may be working correctly but the vehicle control system 175 may be unaware that the state of the air diverter valve has changed, which is why the difference between readings of the ambient air temperature sensor 110 and pre-compressor sensor 125 has increased beyond a threshold level.

In order to remedy the above, heat rejection capabilities of the intercooler 155 of the vehicle may be determined and used to determine an estimated ambient air temperature. The estimated ambient air temperature can be compared to the ambient air temperature sensor value 115 to determine an ambient air temperature error. The ambient air temperature error may subsequently be used to determine whether an error condition or notification associated with the ambient air temperature sensor 110 should be triggered. As such, a determination of the ambient air temperature error may be used to reduce or eliminate false fail notifications caused by inaccurate readings provided by the ambient air temperature sensor 110 when the ambient air temperature sensor 110 is blocked or otherwise obstructed.

The heat rejection capability of the intercooler 155 may be determined in real time or substantially real time. For example, the heat rejection capability of the intercooler 155 (also referred to as an efficiency of the intercooler 155) may be determined continuously or substantially continuously when the engine of the vehicle is running. In other examples, the heat rejection capability of the intercooler 155 may be determined simultaneously or substantially simultaneously to the ambient air temperature sensor 110 providing ambient air temperature sensor values 115. In yet another example, the heat rejection capability of the intercooler 155 may be determined when a set of vehicle operating conditions 400 (FIG. 4) are satisfied. The heat rejection capability of the intercooler 155 may also be determined periodically, in response to received input, at manufacturing time, in response to the engine of the vehicle starting and so on.

In FIG. 1, ambient air 105 (e.g., air outside of an engine compartment of the vehicle), and the subsequent intake and flow of the ambient air 105 into and within the air induction system 100 and ultimately to the engine 170 of the vehicle, is represented by the solid lines and directional arrows. As the air 105 enters and travels through the air induction system 100 of the vehicle, various sensors (represented by black circles) are used to determine temperature and/or pressure values. These values may be provided to a vehicle control system 175 of the vehicle (as represented by dashed lines and direction arrows).

For example and as shown in FIG. 1, an ambient air temperature sensor 110 measures a temperature of the ambient air 105 to generate an ambient air temperature sensor value 115 (also referred to herein as $T_{ambient\_sensor}$). The air 105 may enter an air filter 120 and a pre-compressor sensor 125 may take one or more second sensor reading(s). In some examples, the pre-compressor sensor 125 may be a temperature sensor. In another example, the pre-compressor sensor 125 may be a pressure sensor. In other examples, pre-compressor sensor 125 may comprise both a temperature sensor and a pressure sensor. It is also contemplated that a determined temperature of the air taken by the pre-compressor sensor 125 may be used to determine a pressure of the air 105, and a determined pressure of the air 105 may be used to determine a temperature of the air. Regardless of whether the pre-compressor sensor 125 is a temperature sensor and/or a pressure sensor, the output of the pre-compressor sensor 125 (pressure and/or temperature) is represented as a pre-compressor sensor value 130 (also referred to herein as $p_{ambient}$ for a pressure reading and/or $T_{pre-compressor}$ for a temperature reading). In some examples, a value for $p_{ambient}$ may be determined from a $T_{pre-compressor}$ reading. Likewise, a value for $T_{pre-compressor}$ may be determined from a $p_{ambient}$ value. The air 105 may subsequently enter a compressor 140.

The process for determining the heat rejection capability of the intercooler 155 will now be described. In some examples, the heat rejection capability of the intercooler 155 may change over time and/or based on environmental conditions in which the vehicle is operating. For example, the heat rejection capability of the intercooler 155 may change based on a determined or detected altitude in which the vehicle is operating, current weather conditions, age of the vehicle, age of the intercooler 155, and so on. However, the calculations described below may provide current heat rejection capabilities of the intercooler 155 regardless of the various factors and environmental conditions described above.

In the present disclosure, determining the heat rejection capability of the intercooler 155 is described or referred to as an intercooler efficiency model. The intercooler efficiency model is based on a temperature drop of the air 105 as a fan of the intercooler 155 forces the air 105 through the intercooler 155.

In addition, the efficiency of the intercooler 155 may be based on a number of different factors. These factors may include the ambient air temperature of the air 105, a speed of the air 105 as it passes through the intercooler 155, and a current or detected speed of the vehicle. As will be explained in more detail below, each of these factors is considered by the intercooler efficiency model. The intercooler efficiency model may be implemented by the processing and storage capabilities of the vehicle control system 175 and/or by other computing elements associated with the vehicle.

In some examples, and as used herein, a model (e.g., the intercooler efficiency model and/or the pre-compressor model described in more detail below), may be a combination of hardware, software, and/or data stored in one or more data tables or another storage device. The models may analyze stored data and/or received data (e.g., from various sensors) to determine an output. The output may be subsequently used to accomplish a determined objective. For example, the determined objective in the present example would be a determination as to whether an ambient air temperature sensor is faulty and/ow whether an error notification should be triggered.

The intercooler efficiency model determines the cooling capacity of the intercooler 155 (referred to herein as "Cooling Capacity"). The Cooling Capacity of the intercooler 155 may be determined using the following equation:

$$\text{Cooling Capacity} = \frac{\text{Air\_Mass\_Flow}}{1000 \text{ g/kg}} \times CP \times \frac{T_{IC\_in} - T_{IC\_out}}{T_{IC\_in} - T_{ambient\_est}}$$

In the equation set forth above, Air_Mass_Flow is defined as the rate of fresh air flow through the air induction system 100; CP is the specific heat of air; $T_{IC\_in}$ is an intercooler inlet air temperature 150 value provided by an intercooler inlet air temperature sensor 145 associated with the intercooler 155; $T_{IC\_out}$ is an intercooler outlet air temperature 165 value provided by an intercooler outlet air temperature sensor 160 associated with the intercooler 155; and $T_{ambient\_est}$ is an estimated value for the ambient air temperature.

In some examples, an arbitrary value may initially be used for $T_{ambient\_est}$. However, once the intercooler efficiency model has determined a value for $T_{ambient\_est}$, that value may be substituted for the arbitrary value. Thus, each time (after the initial time) the Cooling Capacity of the intercooler 155 is determined, the previously determined $T_{ambient\_est}$ is plugged into the equation above to determine the current or instantaneous Cooling Capacity of the intercooler 155.

Once the Cooling Capacity of the intercooler 155 has been determined, the intercooler efficiency model accesses a data table, a lookup table, a tunable map or other such storage device that stores information about an ambient flow of the intercooler 155. As used herein, the ambient flow (referred to as "Ambient Flow") of the intercooler 155 describes the ability of the intercooler 155 to cool air (e.g., how efficiently the intercooler 155 cools air 105 based on the rate of fresh air flow through the air induction system 100). In some examples, the determined Ambient Flow is corrected/adjusted based on a detected or determined ambient density of the air 105.

A determination of the Ambient Flow is based, at least in part, on the determined Air_Mass_Flow (described above) and the previously determined Cooling Capacity of the intercooler 155. For example, values associated with the Air_Mass_Flow and the Cooling Capacity of the intercooler 155 may be input into X and Y axes of the lookup table to determine the resultant Ambient Flow. In some examples, the standard density of air is divided out from the Ambient Flow values provided in the table.

The intercooler efficiency model may also determine the cooling flow of the intercooler 155. The cooling flow (referred to as "Cooling Flow") describes the density ratio correction factor for additional heat removal by external air flow. In order to determine the Cooling Flow of the intercooler 155, the intercooler efficiency model may access another data table, a lookup table, a tunable map or other such storage device that stores information about the Cooling Flow of the intercooler 155.

As used herein, the Cooling Flow of the intercooler 155 describes the ability of the intercooler to cool air. However, unlike Ambient Flow, the Cooling Flow does not account for the ambient density of air 105. In some examples, the Cooling Flow is a function of the fan speed of the intercooler 155 and the speed of the vehicle. Thus, when the fan speed of the intercooler 155 and the speed of the vehicle are determined, these values may be provided to X and Y axes of the lookup table to determine the resultant the Cooling Flow of the intercooler 155.

In some examples, the values for the Ambient Flow lookup table and/or the values for the Cooling Flow lookup table are calibrated values. Thus, when various values for Air_Mass_Flow, Cooling Capacity, fan speed and vehicle speed are determined, these values may be used to access values for the Ambient Flow and Cooling Flow respectively.

The intercooler efficiency model may then determine the estimated ambient temperature ($T_{ambient\_est}$) of the air 105 based on the heat rejected by the intercooler 155. The estimated ambient temperature ($T_{ambient\_est}$) is based on the pressure determined from the pre-compressor sensor value 130 ($p_{ambient}$) provided by the pre-compressor sensor 125, the determined Cooling Flow, and the determined Ambient Flow. The following equation may be used by the intercooler efficiency model to determine the estimated ambient temperature ($T_{ambient\_est}$):

$$T_{ambient\_est} = \frac{\frac{1000\, P_a}{kP_a} \times p_{ambient} \times \text{Cooling Flow}}{R_{spec} \times p_0 \times \text{Ambient Flow}}$$

where $R_{spec}$ is the specific gas constant of air and $p_0$ is the standard density of air.

Once the estimated ambient air temperature ($T_{ambient\_est}$) is determined, the intercooler efficiency model determines the ambient air temperature error ($T_{error}$) between the estimated ambient air temperature ($T_{ambient\_est}$) and the ambient air temperature sensor value 115 ($T_{ambient\_sensor}$) provided by the ambient air temperature sensor 110. The ambient air temperature error ($T_{error}$) may be determined by the following equation:

$$T_{error} = |T_{ambient\_sensor} - T_{ambient\_est}|$$

Once the ambient air temperature error ($T_{error}$) is determined, the ambient air temperature error ($T_{error}$) is compared to a temperature difference threshold. In some examples, the temperature difference threshold is fourteen degrees Celsius although other values may be used.

If the ambient temperature error ($T_{error}$) is above the ambient temperature difference threshold for a predetermined amount of time, the vehicle control system 175 causes an error notification to be triggered. In some examples, the error notification is triggered if the ambient temperature error ($T_{error}$) is above the threshold for a predetermined amount of time (e.g., two-hundred seconds) and/or a predetermined number of engine cycles. Triggering of the error notification may cause a check engine light or malfunction indicator light of the vehicle to be illuminated. The check engine light may indicate that the ambient air temperature sensor 110 is faulty.

In some examples, the ambient air temperature error ($T_{error}$) is only determined when the vehicle control system 175 determines or verifies that a set of operating conditions associated with the vehicle have been met. That is, a set of operating conditions must be satisfied prior to the ambient air temperature sensor value 115 being determined, the Ambient Flow being determined, the Cooling Flow being determined, the estimated ambient air temperature ($T_{ambient\_est}$) being determined and/or the ambient air temperature error ($T_{error}$) being determined. These operating conditions are shown in FIG. 4.

For example and turning to FIG. 4, the intercooler efficiency model may only calculate the ambient air temperature error ($T_{error}$) when the vehicle exhibits some or all of the following operating conditions: 1) the engine speed of the vehicle is in a steady state (e.g., an absolute value of a speed of the engine of the vehicle exceeds an engine speed threshold for over a predetermined amount of time); 2) the speed of the vehicle is in a steady state (e.g., an absolute value of a speed of the vehicle exceeds a vehicle speed threshold for over a predetermined amount of time); 3) a fan speed of the vehicle is in a steady state (e.g., an absolute value a speed of a cooling fan of the vehicle exceeds a cooling fan speed threshold for over a predetermined amount of time); 4) a crank power of a crankshaft of the vehicle is in a steady state (e.g., an output power of a crankshaft of the vehicle exceeds an output power threshold for over a predetermined amount of time); 5) a determined crank power of a crankshaft of the vehicle is greater than or equal to a crank power threshold; 6) a determined ambient flow rate of the intercooler is greater than or equal to an ambient flow threshold; 7) a determined coolant temperature of the vehicle is greater than or equal to a coolant temperature threshold; 8) a determined run time of the engine of the vehicle exceeds an engine run time threshold; 9) an estimator run time is greater than or equal to an estimator run time threshold (e.g., the intercooler efficiency model has been executing over a threshold number of times to generate an accurate estimate); 10) a determined ambient air pressure exceeds an ambient air pressure threshold; and 11) a determination that the engine of the vehicle is not idling.

In some examples, all of the vehicle operating conditions 400 must be met prior to the intercooler efficiency model determining one, some or all of the values described above. In other examples, a subset of the vehicle operating conditions 400 must be met prior to the intercooler efficiency model determining one, some or all of the values described above.

The determination of the vehicle operating conditions 400 may be performed while one or more of the values described above are determined. Additionally, the determination of the vehicle operating conditions 400 and/or the determination of one or more of the values needed for the estimated ambient air temperature ($T_{ambient\_est}$) determination may be performed substantially simultaneously with the determination as to whether the ambient air temperature error ($T_{error}$) is above the ambient air temperature difference threshold for a predetermined amount of time. Thus, the vehicle control system 175 of the present disclosure may perform multiple different types of analysis simultaneously or substantially simultaneously.

The present application also describes how to determine a position or state of an air diverter valve of an air induction system associated with a vehicle. Since the temperature of intake air impacts the accuracy of engine air manager control algorithms, it is useful that the vehicle control system 175 is able to determine whether the air diverter valve is in an active state, in which the intake air is pulled from an engine compartment of the vehicle, or whether the air diverter valve is in an inactive or normal state, in which the intake air is pulled from outside of the engine compartment of the vehicle.

Figure 2A:
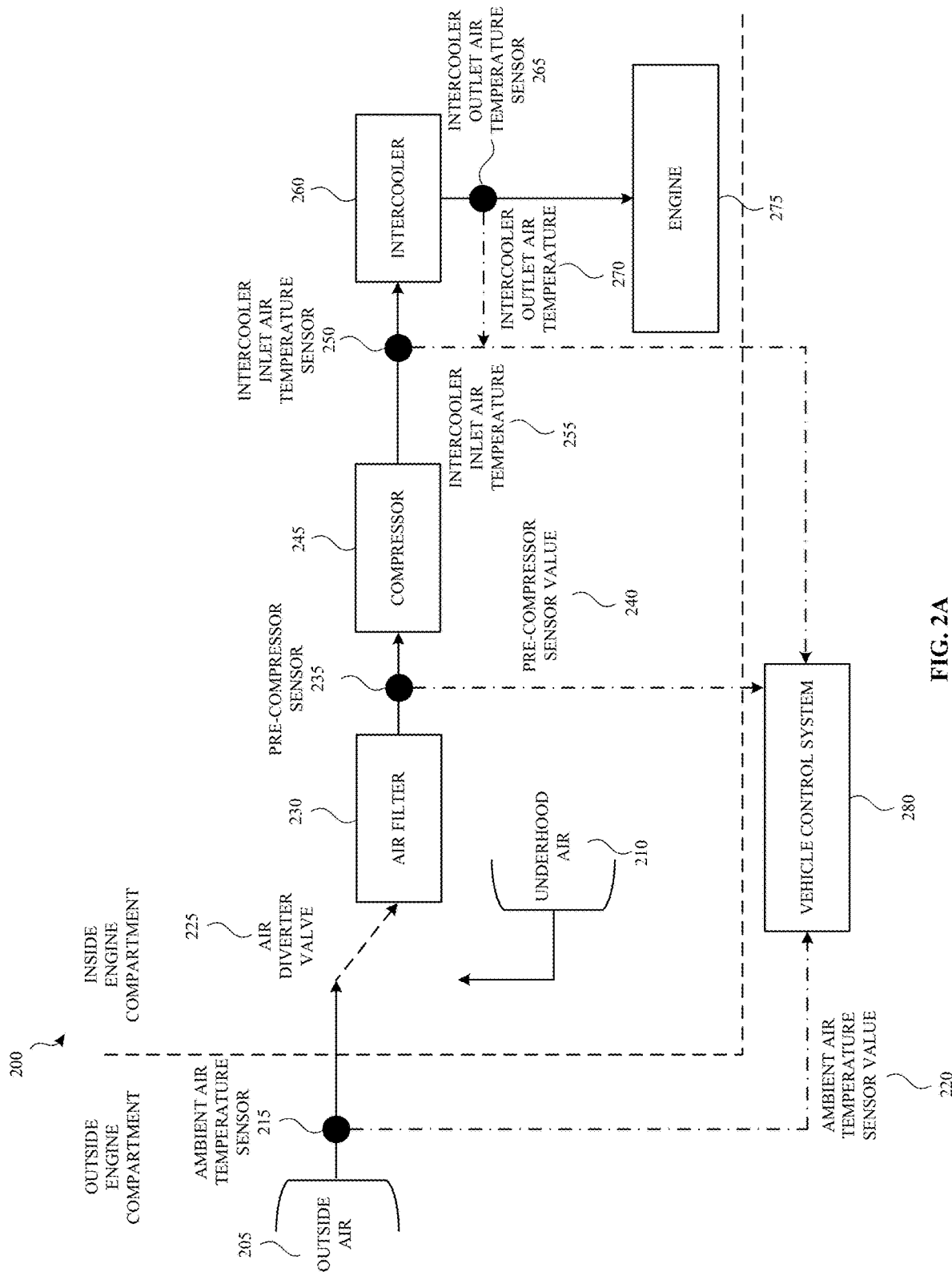
FIG. 2A illustrates an air induction system for a vehicle in which an air diverter valve is in an inactive state according to an example.
Figure 2B:
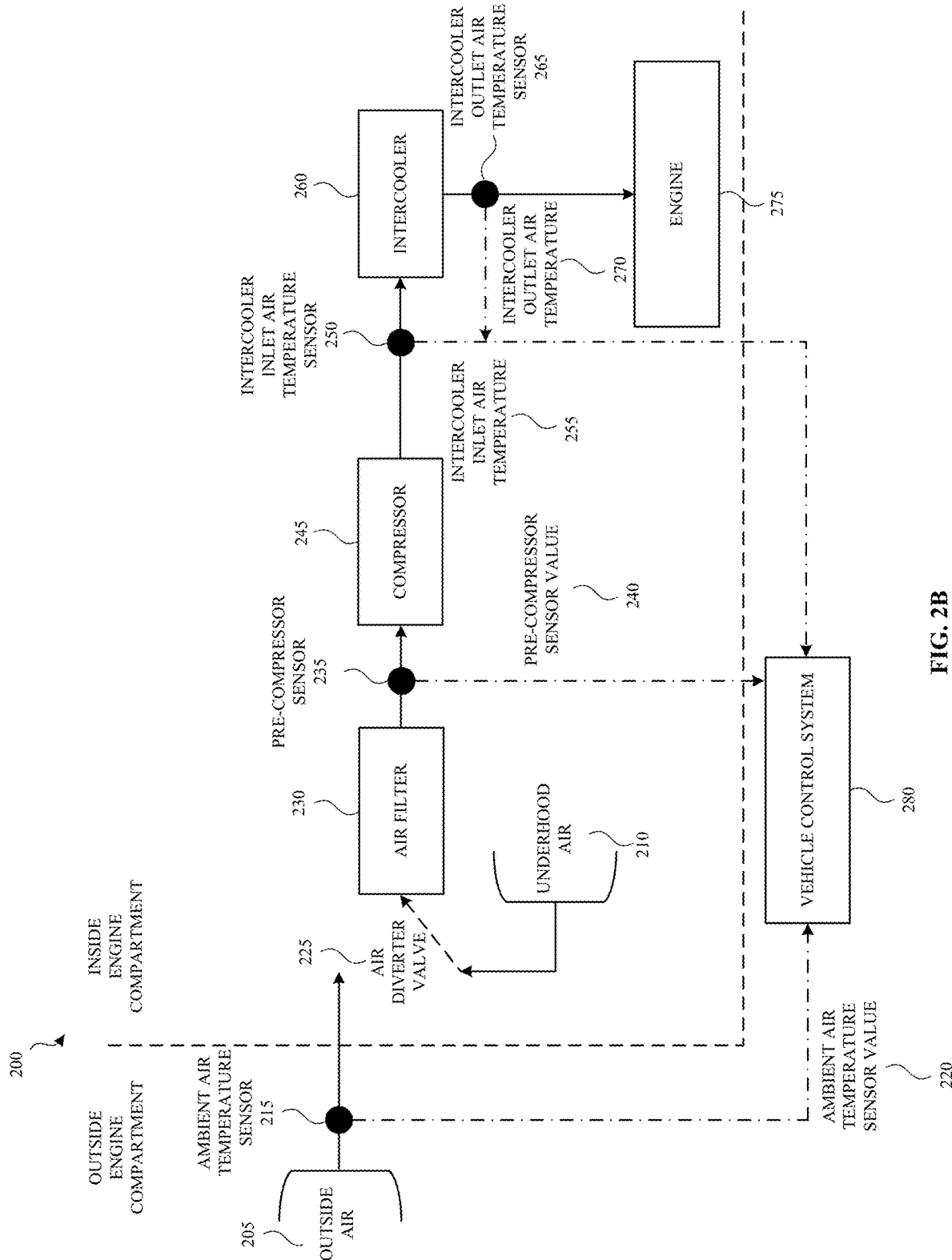
FIG. 2B illustrates the air induction system of FIG. 2A in which the air diverter valve is in an active state according to an example.

FIG. 2A illustrates an air induction system 200 for a vehicle in which an air diverter valve 225 is in an inactive state according to an example. FIG. 2B illustrates the air induction system 200 of FIG. 2A in which the air diverter valve 225 is in an active state according to an example. As shown in FIG. 2A, when the air diverter valve 225 is in the inactive state, outside air 205 is pulled into the air induction system 200 and subsequently provided to an engine 275. As shown in FIG. 2B, when the air diverter valve 225 is in the active state, generally warmer underhood air 210 is pulled into the air induction system 200 and subsequently provided to the engine 275.

The air induction system 200 may use information provided from two different models to determine a state of the air diverter valve 225. The first model is referred to herein as a "pre-compressor model." The second model is referred to as the "intercooler efficiency model." The intercooler efficiency model is similar to the intercooler efficiency model described above with respect to FIG. 1.

In both models, an ambient air temperature sensor 215 is used to measure or otherwise determine an ambient air temperature sensor value 220. The ambient air temperature sensor value 220 is provided to the vehicle control system 280 and may subsequently be used as a reference for both of the models to determine a state of the air diverter valve 225.

When either outside air 205 or underhood air 210 is pulled into the air induction system 200, the air passes through an air filter 230. Prior to the air entering a compressor 245, the pre-compressor model generates an estimated ambient air temperature value. In this example, the estimated ambient air temperature value is represented as pre-compressor sensor value 240. The pre-compressor sensor value 240 is generated by a pre-compressor sensor 235. In some examples, the pre-compressor sensor value 240 may be adjusted to compensate for a determined fan speed of an intercooler 260, a determined engine load and/or a determined speed of the vehicle.

The pre-compressor model compares the pre-compressor sensor value 240 to the ambient air temperature sensor value 220 to determine two different outputs or values for two different variables. The first variable, referred to herein as a "pre-comp cold exceed" variable, is set to "true" when the ambient air temperature sensor value 220 is colder (e.g., has a lower temperature value) than the pre-compressor sensor value 240 for a threshold amount of time (e.g., two-hundred seconds). Otherwise, the pre-comp cold exceed variable may be set to "false." In some examples, the temperature difference between the pre-compressor sensor value 240 and the ambient air temperature sensor value 220 must be above a temperature difference threshold (e.g., fourteen degrees Celsius) for the threshold amount of time in order for the pre-comp cold exceed variable to be set to true.

For example, the pre-comp cold exceed variable may be set to true based on an integral of positive values of a difference between the pre-compressor sensor value 240 and the ambient air temperature sensor value 220 integrated over a time period (e.g., two-hundred seconds). A determination of the integral may be based on the following equation:

Integral: Positive values of (the pre-compressor sensor value 240–the ambient air temperature sensor value 220) integrated over two-hundred seconds.

Once the integral is determined, a value (e.g., true or false) of the pre-comp cold exceed variable may be determined as follows:

Pre-comp Cold Exceed:Integral>(200 seconds*14 Degrees Celsius).

The second variable, referred to herein as "pre-comp hot exceed" variable, is set to "true" when the ambient air temperature sensor value 220 is warmer (e.g., has a higher temperature value) than the pre-compressor sensor value 240 for a threshold amount of time (e.g., two-hundred seconds). Otherwise, the pre-comp hot exceed variable may be set to "false." In some examples, the temperature difference between the ambient air temperature sensor value 220 and the pre-compressor sensor value 240 must be above a temperature difference threshold (e.g., fourteen degrees Celsius) for a threshold amount of time (e.g., two-hundred seconds) in order for the pre-comp hot exceed variable to be true.

For example, the pre-comp hot exceed variable may be set to true based on an integral of positive values of a difference between the pre-compressor sensor value 240 and the ambient air temperature sensor value 220 integrated over a time period (e.g., two-hundred seconds). A determination of the integral may be based on the following equation:

> Integral: Positive values of (the ambient air temperature sensor value 220–the pre-compressor sensor value 240) integrated over two-hundred seconds.

Once the integral is determined, a value (e.g., true or false) of pre-comp hot exceed variable may be determined as follows:

> Pre-comp Hot Exceed:Integral>(200 seconds*14 Degrees Celsius).

Once the values for the pre-comp cold exceed variable and the pre-comp hot exceed variable are determined, those values are temporarily stored (e.g., by the vehicle control system 280) until a value for a variable associated with the intercooler efficiency model (referred to herein as "intercooler exceed" variable) is determined.

Although the example above indicates that values for the pre-comp cold exceed variable and the pre-comp hot exceed variable are determined before the intercooler exceed variable, the present application is not so limited. In some examples, values for the pre-comp cold exceed variable, the pre-comp hot exceed variable and the intercooler exceed variable may be determined simultaneously or substantially simultaneously. In another example, a value for the intercooler exceed variable may be determined prior to the values for the pre-comp cold exceed variable and/or the pre-comp hot exceed variable. In either case, all values for the pre-comp cold exceed variable, the pre-comp hot exceed variable and the intercooler exceed variable may need to be determined and subsequently analyzed to accurately determine a state of the air diverter valve 225.

The intercooler efficiency model may determine an estimated ambient air temperature ($T_{ambient\_est}$) using the same formula described above with respect to FIG. 1. For example, the intercooler efficiency model calculates the Cooling Capacity of the intercooler 260 and determines the Ambient Flow and the Cooling Flow. For example, the Cooling Capacity of the intercooler 260 is calculated using the same equation as set forth above in relation to FIG. 1, wherein Air_Mass_Flow is defined as the rate of fresh air flow through the air induction system 100; CP is the specific heat of air; $T_{IC\_in}$ is an intercooler inlet air temperature 255 value provided by an intercooler inlet air temperature sensor 250 associated with the intercooler 260; $T_{IC\_out}$ is an intercooler outlet air temperature 270 value provided by an intercooler outlet air temperature sensor 265 associated with the intercooler 260; and ($T_{ambient\_est}$) is an estimated value for the ambient air temperature. These values are used to determine the estimated ambient air temperature ($T_{ambient\_est}$) such as previously described. For convenience, this equation is reproduced below:

$$T_{ambient\_est} = \frac{\frac{1000\, P_a}{kP_a} \times p_{ambient} \times \text{Cooling Flow}}{R_{spec} \times p_0 \times \text{Ambient Flow}}$$

where $R_{spec}$ is the specific gas constant of air and $p_o$ is the standard density of air.

Once the estimated ambient air temperature ($T_{ambient\_est}$) is determined, an output value (e.g., either true or false) for the intercooler exceed variable may be provided by the intercooler efficiency model. For example, intercooler exceed variable may be set to true based on an integral of positive values of a difference between the estimated ambient air temperature ($T_{ambient\_est}$) and the ambient air temperature sensor value 220 integrated over a time period (e.g., two-hundred seconds). A determination of the integral may be based on the following equation:

> Integral: Absolute value of ($T_{ambient\_est}$–the ambient air temperature sensor value 220) integrated over two-hundred seconds.

Once the integral is determined, the value (e.g., true or false) of the intercooler exceed variable may be determined as follows:

> Intercooler Exceed:Integral>(200 seconds*14 Degrees Celsius).

In some examples, the pre-compressor sensor 235 is more sensitive to changes in the temperature of the air caused by a position of the air diverter valve 225 when compared to the intercooler efficiency model. Thus, when the two models are used together to determine a state of the air diverter valve 225 and the likelihood of a true failure of the ambient air temperature sensor 215, the resulting determination will be more accurate when compared to each model being used alone.

In order to determine the state of the air diverter valve 225, the values for the pre-comp cold exceed variable, the pre-comp hot exceed variable and the intercooler exceed variable may be compared against a truth table (shown in FIG. 7) to determine whether the air diverter valve 225 is in an inactive state (such as shown in FIG. 2A) or is in an active state (such as shown in FIG. 2B).

FIG. 7 illustrates an example truth table 700 that may be used to determine a state of an air diverter valve of a vehicle according to an example. In the example shown in FIG. 7, the boxes highlighted in gray represent conditions in which normal or expected operating behavior of the various sensors are represented. If other states in the truth table 700 are found based on values for the pre-comp cold exceed variable, the pre-comp hot exceed variable, and the intercooler exceed variable, an indication may be triggered that one or more sensors of the air induction system may be faulty and/or the state of the air diverter valve is indeterminable.

As shown in FIG. 7, when the values of the intercooler exceed variable, the pre-comp cold exceed variable and the pre-comp hot exceed variable are false, it may be determined that an ambient air temperature sensor (e.g., ambient air temperature sensor 215 (FIG. 2A)) is functioning correctly. It may also be determined that an air diverter valve (e.g., air diverter valve 225 (FIG. 2A)) is in an inactive state. As such, outside air is being pulled into an air induction system of the vehicle.

However, when the values of the intercooler exceed variable and the pre-comp hot exceed variable are false, and the value for the pre-comp cold exceed variable is true, it may be determined that the ambient air temperature sensor (e.g., ambient air temperature sensor 215 (FIG. 2A)) is functioning correctly, but the air diverter valve (e.g., air diverter valve 225 (FIG. 2A)) is in an active state. As such, relatively warmer underhood air is being pulled into an air induction system of the vehicle. In such cases, the vehicle control system may determine that one or more diagnostics of the vehicle may need to be deactivated and/or thresholds for the one or more diagnostics may need to be adjusted.

Figure 3:
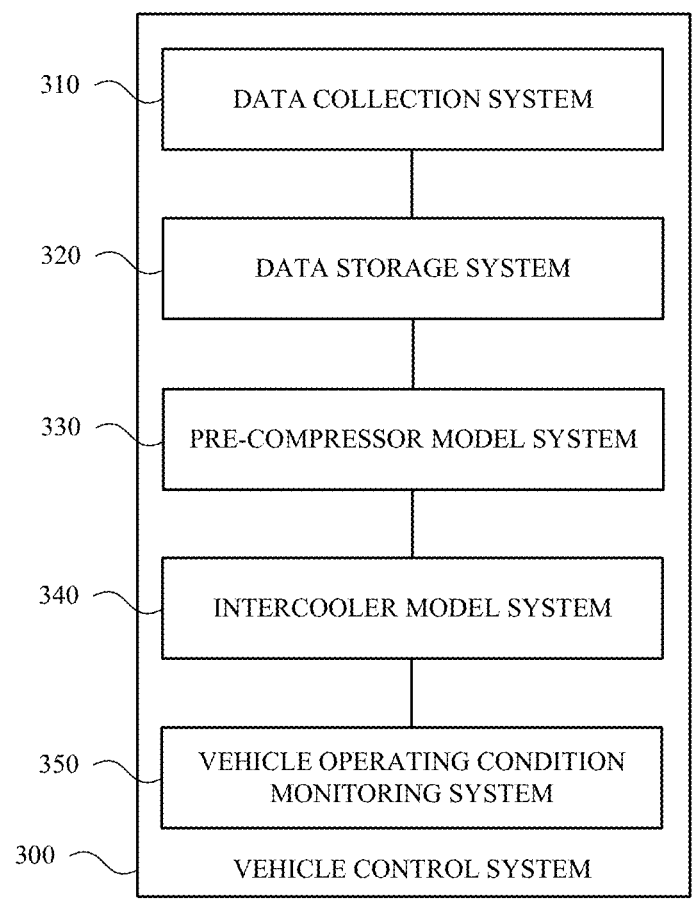
FIG. 3 illustrates an example vehicle control system associated with a vehicle according to an example.

FIG. 3 illustrates an example vehicle control system 300 of a vehicle according to an example. The vehicle control system 300 may communicate or otherwise be associated with an air induction system such as, for example, air induction system 100 (FIG. 1). As such, the vehicle control system 300 may be used to process various sensor values provided the various sensors of the air induction system. The vehicle control system 300 may also store information relating to various operating conditions of the vehicle, a state of an air diverter valve, outputs/values of the various models described herein and so on.

The vehicle control system 300 may include a data collection system 310. The data collection system 310 may receive information from various systems, sensors, and components of the vehicle. In some examples, the data collection system 310 may receive ambient air temperature sensor values from an ambient air temperature sensor. The data collection system 310 may also receive a pre-compressor sensor value from a pre-compressor sensor. In another example, the data collection system 310 may receive intercooler inlet air temperature values from an intercooler inlet air temperature sensor and/or may receive intercooler outlet air temperature values from an intercooler outlet air temperature sensor.

The data collection system 310 may also receive vehicle operating conditions, such as those shown and described with respect to FIG. 4, from a vehicle operating condition monitoring system 350. The data collection system 310 may also communicate or otherwise work in conjunction with the pre-compressor model system 330 and/or the intercooler model system 340 to determine an estimated ambient air temperature ($T_{ambient\_est}$), the determined Ambient Flow, the determined Cooling Flow, a value for the pre-comp cold exceed variable, a value for the pre-comp hot exceed variable and a value for the intercooler exceed variable. As this information is received, the information may be stored in a data storage system 320.

Figure 5:
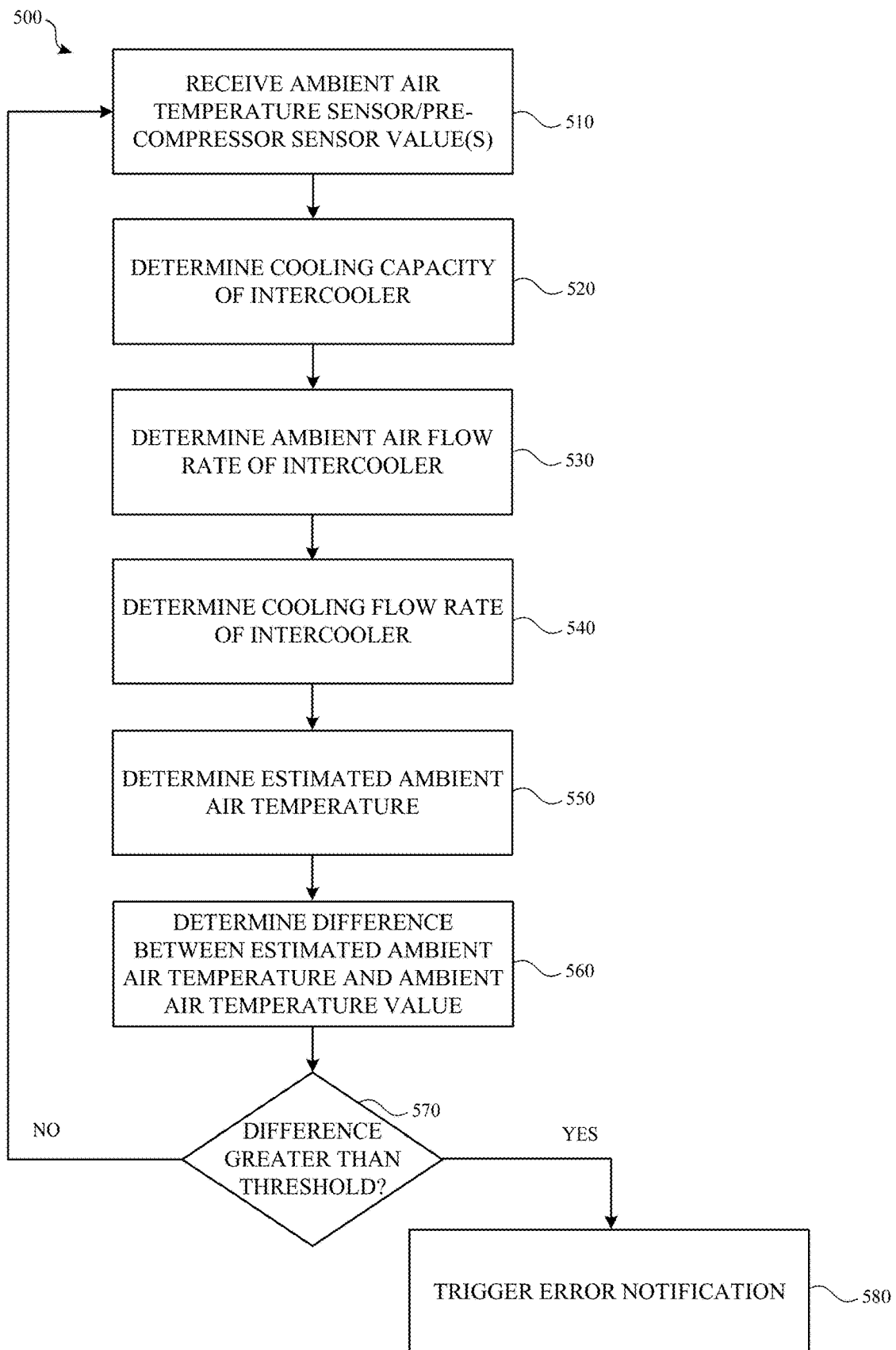
FIG. 5 illustrates a method for determining whether to trigger an error notification for a vehicle based on a comparison between an ambient air temperature reading and an estimated ambient air temperature according to an example.

FIG. 5 illustrates a method 500 for determining whether to trigger an error notification for a vehicle based on a comparison between an ambient air temperature reading and an estimated ambient air temperature according to an example. The method 500 may be performed by a vehicle control system, such as, for example, vehicle control system 300 (FIG. 3), associated with a vehicle. In some examples, the vehicle control system may be communicatively coupled with various sensors and systems of an air induction system such as, for example, air induction system 100 (FIG. 1).

In some examples, method 500 does not begin until a set of vehicle operating conditions (e.g., vehicle operating conditions 400 (FIG. 4)) are satisfied. If it is determined the set of vehicle operating conditions are satisfied, the method 500 may begin.

Method 500 begins at operation 510 in which an ambient air temperature sensor reading and/or a pre-compressor sensor reading are received. The ambient air temperature sensor reading may be received from an ambient air temperature sensor associated with the vehicle. The pre-compressor sensor reading may be received from a pre-compressor sensor associated with the vehicle.

The ambient air temperature sensor may be positioned outside of an engine compartment of the vehicle while the pre-compressor sensor may be positioned within the engine compartment of the vehicle. In some examples, the ambient air temperature sensor is positioned in side mirror of the vehicle. Although specific locations are given, the ambient air temperature sensor and the pre-compressor sensor may be provided on any suitable location of the vehicle.

In operation 520, a Cooling Capacity of an intercooler of the vehicle is determined. As explained above, the Cooling Capacity of the intercooler may be determined based on a determined air mass flow (Air_Mass_Flow) (e.g., the rate of fresh air flow through the air induction system), the specific heat of air (CP), a temperature difference of air between an intercooler inlet air temperature sensor ($T_{IC\_in}$) and an intercooler outlet air temperature sensor ($T_{IC\_out}$), and a difference between the value ($T_{IC\_in}$) provided by the intercooler inlet air temperature sensor an estimated value for the ambient air temperature ($T_{ambient\_est}$). As described with respect to FIG. 1, the following equation may be used to determine the Cooling Capacity of the intercooler:

$$\text{Cooling Capacity} = \frac{\text{Air\_Mass\_Flow}}{1000 \text{ g/kg}} \times CP \times \frac{T_{IC\_in} - T_{IC\_out}}{T_{IC\_in} - T_{ambient\_est}}$$

Once the Cooling Capacity of the intercooler has been determined, flow proceeds to operation 530 and an Ambient Flow rate of the intercooler is determined. The Ambient Flow rate of the intercooler describes the ability of the intercooler to cool air mass flow. In some examples, the Ambient Flow is adjusted based on a detected or determined ambient density of air.

The Ambient Flow rate is based, at least in part, on the determined air mass flow and the Cooling Capacity of the intercooler. In some examples, values for the air mass flow and the Cooling Capacity are stored in a data table, a lookup table, a tunable map or other such storage device. Thus, when the air mass flow and the Cooling Capacity is determined, these values may be used to determine a pre-calculated/calibrated Ambient Flow rate. In some examples, ambient density of air is accounted for when determining the Ambient Flow rate.

Flow then proceeds to operation 540 and a Cooling Flow rate of the intercooler is determined. The Cooling Flow rate of the intercooler is based, at least in part, on a function of the fan speed of the intercooler and the speed of the vehicle. In some examples, values for the fan speed of the intercooler and the speed of the vehicle are stored in a data table, a lookup table, a tunable map or other such storage device. Thus, when those values are received, the Cooling Flow rate of the intercooler may be determined. In some examples, the Cooling Flow is not adjusted or otherwise does not account for ambient density of air.

In operation 550 an estimated ambient air temperature ($T_{ambient\_est}$) is determined. The estimated ambient air temperature ($T_{ambient\_est}$) may be based on the amount of heat rejected by the intercooler. The estimated ambient air temperature ($T_{ambient\_est}$) is determined using the pre-compressor sensor value ($p_{ambient}$) provided by the pre-compressor sensor, the determined Cooling Flow rate, and the determined Ambient Flow rate. The following equation may be used to determine estimated ambient air temperature ($T_{ambient\_est}$):

$$T_{ambient\_est} = \frac{\frac{1000 \, P_a}{kP_a} \times p_{ambient} \times \text{Cooling Flow}}{R_{spec} \times p_0 \times \text{Ambient Flow}}$$

where $R_{spec}$ is the specific gas constant of air and $p_0$ is the standard density of air.

Flow then proceeds to operation 560 and a difference (represented as $T_{error}$) between the estimated ambient temperature ($T_{ambient\_est}$) and the ambient air temperature sensor value ($T_{ambient\_sensor}$) is determined. The difference between these values is determined using the following equation:

$$T_{error} = |T_{ambient\_sensor} - T_{ambient\_est}|$$

In operation 570 a determination is made as to whether the difference between the estimated ambient air temperature ($T_{ambient\_est}$) and the ambient air temperature sensor value ($T_{ambient\_sensor}$) is above a determined temperature difference threshold for a determined period of time. In some examples, the temperature difference threshold is fourteen degrees Celsius (although other values may be used) and the determined period of time is two-hundred seconds (although other periods of time may be used).

If the determined difference between the estimated ambient air temperature ($T_{ambient\_est}$) and the ambient air temperature sensor value ($T_{ambient\_sensor}$) is not above the determined temperature difference threshold for the determined period of time, flow proceeds back to operation 510 and the method 500 may repeat.

However, if the determined difference between the estimated ambient air temperature ($T_{ambient\_est}$) and the ambient air temperature sensor value ($T_{ambient\_sensor}$) is above the determined temperature difference threshold for the determined period of time, flow proceeds to operation 580 and the vehicle control system causes an error notification to be triggered. Triggering an error notification may cause a check engine light or a malfunction indicator light of the vehicle to be illuminated or other error message to be displayed. The indication may communicate that the ambient air temperature sensor is faulty.

Figure 6:
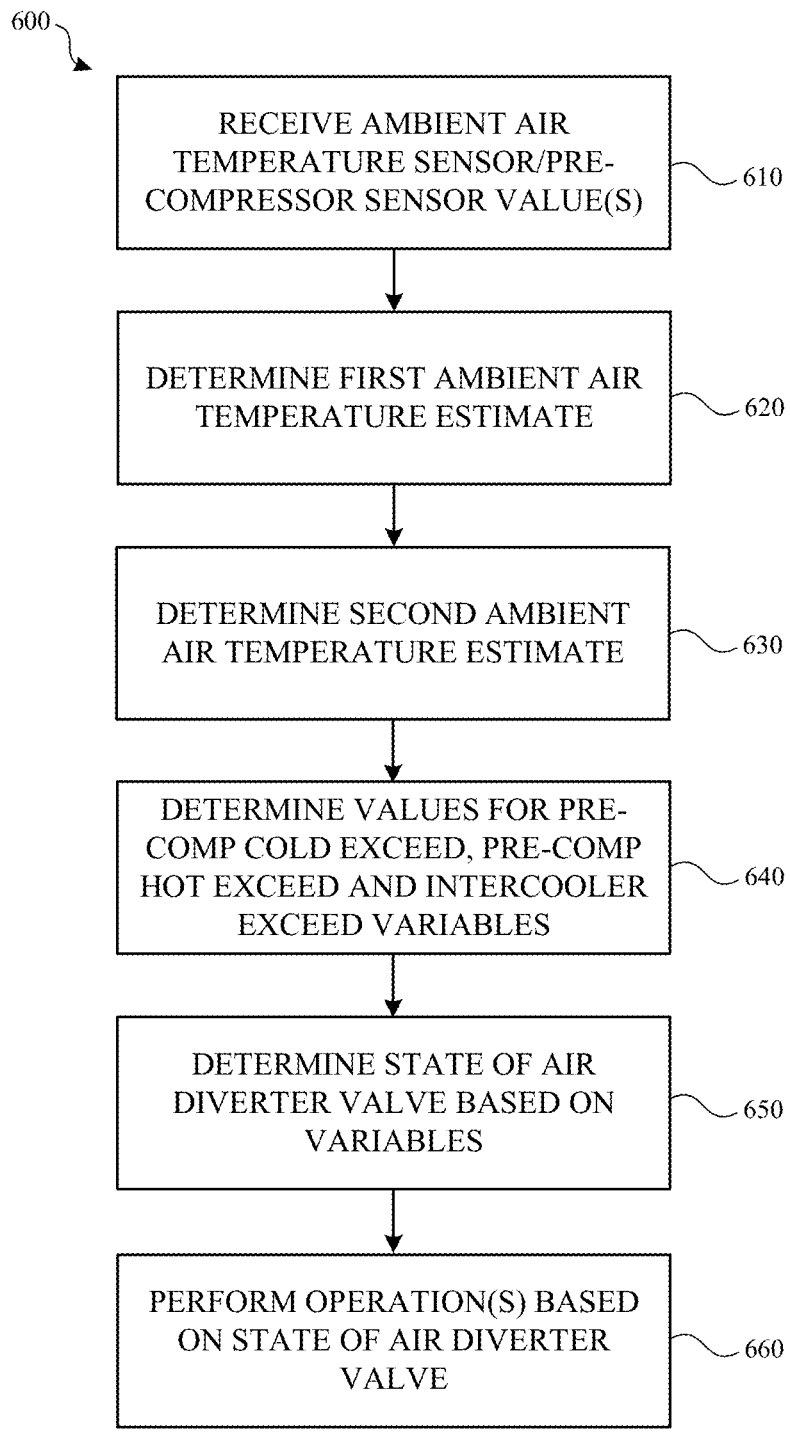
FIG. 6 illustrates a method for determining a state of an air diverter valve of a vehicle according to an example.

FIG. 6 illustrates a method 600 for determining a state of an air diverter valve of a vehicle according to an example. The method 600 may be performed by a vehicle control system, such as, for example, the vehicle control system 300 (FIG. 3), as the vehicle control system receives information from various sensors of an air induction system, such as, for example, air induction system 100 (FIG. 1). In some examples, method 500 (FIG. 5) (or various operations of method 500) may be executed in simultaneously or substantially simultaneously with the various operations described with respect to method 600.

In some aspects, some of the operations described with respect to FIG. 6 may not proceed until some of the operations described with respect to FIG. 6 have been completed. For example, some of the operations in method 600 may not proceed until operations 620, 630, 650, and/or 660 have been completed. Thus, one or more operations of method 600 may effectively be put on hold until a first ambient temperature estimate and a second ambient temperature estimate are determined and/or values for a pre-comp cold exceed variable, a pre-comp hot exceed variable and/or an intercooler exceed variable are determined.

Method 600 begins at operation 610 in which an ambient air temperature reading and/or a pre-compressor sensor reading are received. The ambient air temperature reading may be received from an ambient air temperature sensor associated with the vehicle. The pre-compressor sensor value may be received by a pre-compressor sensor associated with the vehicle such as previously described.

Flow then proceeds to operation 620 in which a first ambient air temperature estimate is determined. In some examples, the first ambient air temperature estimate is based on a first temperature model. The first temperature model is referred to herein as the pre-compressor model such as previously described.

The pre-compressor model generates an estimated ambient air temperature using the pre-compressor sensor reading provided by the pre-compressor sensor. In some examples, the pre-compressor sensor value is adjusted to compensate for a determined fan speed of the intercooler, a determined engine load and/or a speed of the vehicle.

Once the pre-compressor ambient air temperature estimate is determined, flow may proceed to operation 630 and a second ambient air temperature estimate is determined. The second ambient air temperature (e.g., the estimated ambient air temperature ($T_{ambient\_est}$)) may be determined using the intercooler efficiency model described above.

Flow then proceeds to operation 640 and the first ambient temperature estimate is compared with the ambient air temperature reading to determine values for three different variables. These variables are referred to herein as the intercooler exceed variable, the pre-comp cold exceed variable and the pre-comp hot exceed variable.

The estimated ambient air temperature is used to determine an output value for the intercooler exceed variable. The value may be either true or false based, at least in part, on the output of the intercooler efficiency model such as described above.

The pre-comp cold exceed variable is set to true when the ambient air temperature sensor value has a lower temperature value than the pre-compressor sensor value for a threshold amount of time. Otherwise, the pre-comp cold exceed variable may be set to false. As previously explained, the temperature difference between the pre-compressor sensor value and the ambient air temperature sensor value may be required to be above a temperature difference threshold (e.g., fourteen degrees Celsius) for the threshold amount of time in order for the pre-comp cold exceed variable to be set to true.

The pre-comp hot exceed variable is set to true when the ambient air temperature sensor value has a higher temperature value than the pre-compressor sensor value for a threshold amount of time. Otherwise, the pre-comp hot exceed variable may be set to false. As previously explained, the temperature difference between the ambient air temperature sensor value and the pre-compressor sensor value may be required to be above a temperature difference threshold (e.g., fourteen degrees Celsius) for the threshold amount of time in order for the pre-comp hot exceed variable to be set to true.

In operation 650, the values for the pre-comp cold exceed variable, the pre-comp hot exceed variable and the intercooler exceed variable are used to determine a state of the air diverter valve. In some examples, the values for the pre-comp cold exceed variable, the precomp hot exceed variable and the intercooler exceed variable may be compared against a truth table (e.g., output states 700 (FIG. 7)) to determine (operation 650) whether the air diverter valve is in an inactive state or is in an active state.

For example, if the intercooler exceed variable, the pre-comp cold exceed variable and the pre-comp hot exceed variable are all false, the engine control system may determine that an air diverter valve of an air induction system is in an inactive state. As such, outside air is being pulled into an air induction system of the vehicle. The engine control system may also determine that an ambient air temperature sensor associated with the vehicle is functioning correctly.

When the intercooler exceed variable and the pre-comp hot exceed variable are set to false and the pre-comp cold exceed variable is set to true, the vehicle control system may determine that the ambient air temperature sensor that the air diverter valve is in an active state. As such, underhood air is being pulled into an air induction system of the vehicle. The engine control system may also determine that the ambient air temperature sensor of the vehicle is functioning correctly In operation 660, one or more operations may be performed based on the determined state of the air diverter valve. For example, if the vehicle control system determines that the air diverter valve is in an active state, thresholds for one or more diagnostics may be changed. In other examples, one or more diagnostics may be deactivated until the air diverter valve is in an inactive state. In another example, the vehicle control system may determine that an error notification should be triggered based on the ambient temperature sensor reading and a determined state of the air diverter valve.

Figure 8:
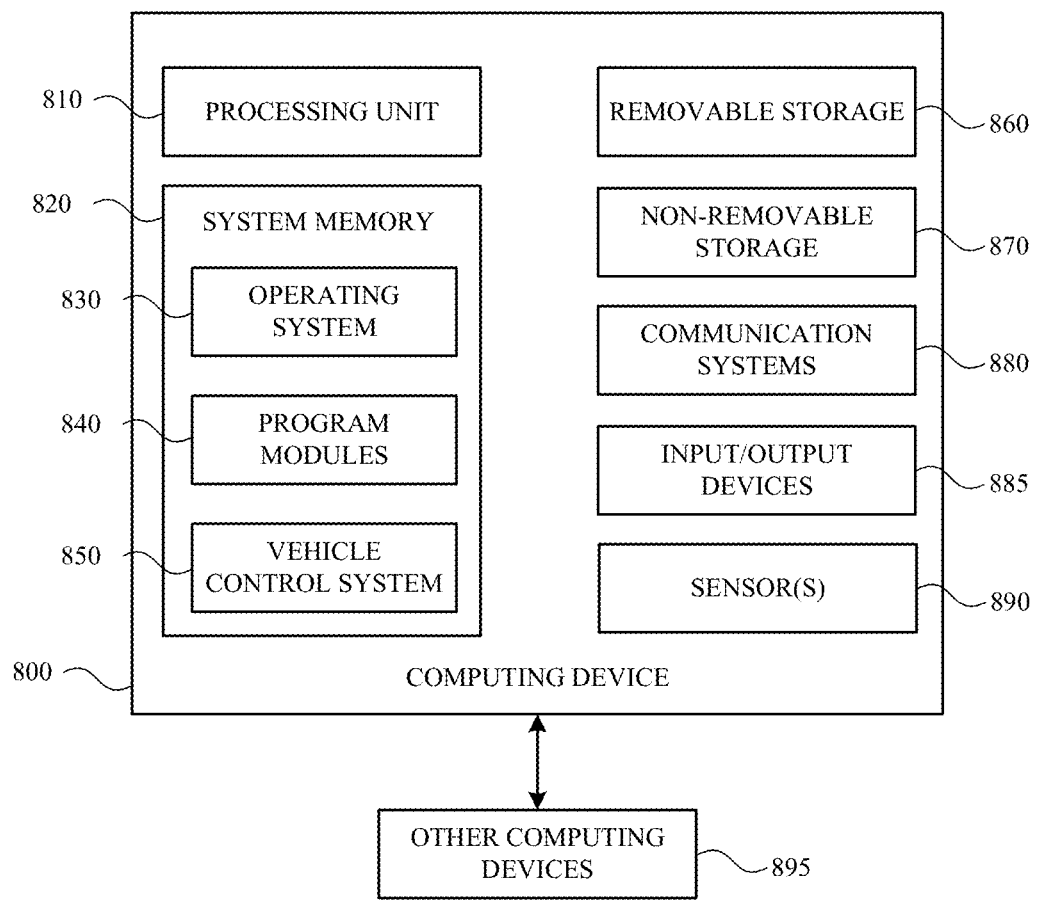
FIG. 8 is a system diagram illustrating example physical components of a computing device according to an example.

FIG. 8 is a system diagram of a computing device 800 according to an example. The computing device 800, or various components and systems of the computing device 800, may be integrated or associated with the various systems and/or subsystems described herein. For example, vehicle control system 175 or 280 may be implemented in or using the computing device 800. As shown in FIG. 8, the physical components (e.g., hardware) of the computing device are illustrated and these physical components may be used to practice the various aspects of the present disclosure.

The computing device 800 may include at least one processing unit 810 and a system memory 820. The system memory 820 may include, but is not limited to, volatile storage (e.g., random access memory), non-volatile storage (e.g., read-only memory), flash memory, or any combination of such memories. The system memory 820 may also include an operating system 830 that controls the operation of the computing device 800 and one or more program modules 840. The program modules 840 may be responsible for receiving input, processing information, storing information, triggering error notifications and so on. Additionally or alternatively, the vehicle control system 850 may be responsible for receiving input, processing information, triggering error notifications and so on. The memory 820 may also store and/or provide similar information and details. While executing on the processing unit 810, the program modules 840 may perform the various processes described above.

The computing device 800 may also have additional features or functionality. For example, the computing device 800 may include additional data storage devices (e.g., removable and/or non-removable storage devices) such as, for example, magnetic disks, optical disks, or tape. These additional storage devices are labeled as a removable storage 860 and a non-removable storage 870.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 8 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 800 on the single integrated circuit (chip). The disclosure may also be practiced using other technologies capable of performing logical operations such as, for example, AND, OR, and NOT, including but not limited to mechanical, optical, fluidic, and quantum technologies.

The computing device 800 may include one or more communication systems 880 that enable the computing device 800 to communicate with other computing devices 895. Examples of communication systems 880 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 800 may also have one or more input devices and/or one or more output devices shown as input/output devices 885. These input/output devices 885 may include a keyboard, a sound or voice input device, haptic devices, a touch, force and/or swipe input device, a display, speakers, etc. The aforementioned devices are examples and others may be used. The computing device 800 may also include various sensors 890 such as described herein.

The term computer-readable media as used herein may include computer storage media. Computer storage media may include volatile and nonvolatile, removable and non-removable media implemented in any method or technology for storage of information, such as computer readable instructions, data structures, or program modules.

The system memory 820, the removable storage 860, and the non-removable storage 870 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system, comprising:
   a processor; and
   a memory communicatively coupled to the processor and storing instructions that, when executed by the processor, perform operations, comprising:
      receiving an ambient air temperature reading from an ambient air temperature sensor associated with a vehicle;
      determining a cooling capacity of an intercooler associated with the vehicle;
      determining an ambient air flow rate through the intercooler associated with the vehicle;
      determining a cooling flow rate of the intercooler associated with the vehicle;
      determining an estimated ambient air temperature based, at least in part, on the cooling capacity of the intercooler, the ambient air flow rate of the intercooler and the cooling flow rate of the intercooler;
      determining a difference between the ambient air temperature reading and the estimated ambient air temperature; and
      triggering an error notification for the vehicle when the determined difference between the ambient air temperature reading and the estimated ambient air temperature is above a threshold.

2. The system of claim 1, wherein the ambient air flow rate through the intercooler is based, at least in part, on a rate of air flow through an engine induction system of the vehicle and the cooling capacity of the intercooler.

3. The system of claim 1, wherein determining the ambient air flow rate through the intercooler comprises instructions for looking up the ambient air flow rate through the intercooler in an ambient air flow rate lookup table.

4. The system of claim 1, wherein the cooling flow rate of the intercooler is based, at least in part, on an intercooler fan speed of the vehicle and a current speed of the vehicle.

5. The system of claim 1, wherein determining the cooling flow rate of the intercooler comprises instructions for looking up the cooling flow rate of the intercooler in a cooling flow rate lookup table.

6. The system of claim 1, further comprising instructions for triggering the error notification for the vehicle when the determined difference between the ambient air temperature reading and the estimated ambient air temperature is over a threshold for a predetermined amount of time.

7. The system of claim 1, further comprising instructions for determining the ambient air flow rate through the intercooler associated with the vehicle when a set of operating conditions of the vehicle are satisfied.

8. The system of claim 7, wherein the set of operating conditions comprise two or more of:
   a speed of an engine of the vehicle exceeding an engine speed threshold for over a predetermined amount of time;
   the ambient air flow rate through the intercooler exceeding an ambient air flow rate minimum value;
   a temperature of a coolant associated with the vehicle exceeding a coolant temperature minimum value;
   a run time of the engine of the vehicle exceeding an engine run time minimum value;
   a determined ambient air pressure exceeding an ambient air pressure minimum value;
   a current speed of the vehicle exceeding a minimum vehicle speed threshold;
   a determination as to whether the vehicle is idling;
   a determined crank power of a crankshaft associated with vehicle exceeding a crank power minimum threshold;
   a determined output power of the engine being within an output power range;
   a time frame associated with the estimated ambient air temperature exceeding a minimum estimated ambient air temperature time frame value; or
   a determined fan speed of a cooling fan associated with vehicle is within a cooling fan speed range.

9. A method, comprising:
   receiving an ambient air temperature reading from an ambient air temperature sensor associated with a vehicle;
   determining an estimated ambient air temperature based, at least in part, on:
      a determined cooling capacity of an intercooler associated with the vehicle;
      a determined ambient air flow rate through the intercooler; and
      a determined cooling flow rate of the intercooler;
   determining a difference between the ambient air temperature reading and the estimated ambient air temperature; and
   triggering an error notification for the vehicle when the determined difference between the ambient air temperature reading and the estimated ambient air temperature is above a threshold.

10. The method of claim 9, wherein the threshold is fourteen degrees Celsius.

11. The method of claim 9, further comprising triggering the error notification for the vehicle when the determined difference between the ambient air temperature reading and the estimated ambient air temperature is above the threshold for a predetermined amount of time.

12. The method of claim 11, wherein the predetermined amount of time is two-hundred seconds.

13. The method of claim 9, wherein the ambient air temperature sensor is outside of an engine compartment of the vehicle.

14. The method of claim 9, wherein the ambient air flow rate through the intercooler is based, at least in part, on a rate of air flow through an engine induction system of the vehicle and the cooling capacity of the intercooler.

15. The method of claim 9, wherein the cooling flow rate of the intercooler is based, at least in part, on an intercooler fan speed of the vehicle and a current speed of the vehicle.

16. The method of claim 9, further comprising determining the ambient air flow rate through the intercooler associated with the vehicle when a set of operating conditions of the vehicle are satisfied.

17. The method of claim 16, wherein the set of operating conditions comprise two or more of:
   a speed of an engine of the vehicle exceeding an engine speed threshold for over a predetermined amount of time;
   the ambient air flow rate through the intercooler exceeding an ambient air flow rate minimum value;
   a temperature of a coolant associated with the vehicle exceeding a coolant temperature minimum value;
   a run time of the engine of the vehicle exceeding an engine run time minimum value;

a determined ambient air pressure exceeding an ambient air pressure minimum value;
a current speed of the vehicle exceeding a minimum vehicle speed threshold;
a determination as to whether the vehicle is idling;
a determined crank power of a crankshaft associated with vehicle exceeding a crank power minimum threshold;
a determined output power of the engine being within an output power range;
a time frame associated with the estimated ambient air temperature exceeding a minimum estimated ambient air temperature time frame value; or
a determined fan speed of a cooling fan associated with vehicle is within a cooling fan speed range.

18. A method, comprising:
determining whether a set of vehicle operating conditions are satisfied; and
when the set of vehicle operating conditions are satisfied:
receiving an ambient air temperature reading from an ambient air temperature sensor associated with a vehicle;
determining an estimated ambient air temperature based, at least in part, on:
a determined cooling capacity of an intercooler associated with the vehicle;
a determined ambient air flow rate through the intercooler; and
a determined cooling flow rate of the intercooler;
determining a difference between the ambient air temperature reading and the estimated ambient air temperature; and
triggering an error notification for the vehicle when the determined difference between the ambient air temperature reading and the estimated ambient air temperature is above a threshold.

19. The method of claim 18, wherein the set of operating conditions of the vehicle are selected from a group comprising:
a speed of an engine of the vehicle exceeding an engine speed threshold for over a predetermined amount of time;
the ambient air flow rate through the intercooler exceeding an ambient air flow rate minimum value;
a temperature of a coolant associated with the vehicle exceeding a coolant temperature minimum value;
a run time of the engine of the vehicle exceeding an engine run time minimum value;
a determined ambient air pressure exceeding an ambient air pressure minimum value;
a current speed of the vehicle exceeding a minimum vehicle speed threshold;
a determination as to whether the vehicle is idling;
a determined crank power of a crankshaft associated with vehicle exceeding a crank power minimum threshold;
a determined output power of the engine being within an output power range;
a time frame associated with the estimated ambient air temperature exceeding a minimum estimated ambient air temperature time frame value; or
a determined fan speed of a cooling fan associated with vehicle is within a cooling fan speed range.

20. The method of claim 18, further comprising causing an illumination of the error notification on a dashboard associated with the vehicle.

* * * * *